United States Patent
Bang et al.

(10) Patent No.: US 9,692,647 B2
(45) Date of Patent: Jun. 27, 2017

(54) APPARATUS AND METHOD FOR REGISTERING AND DE-REGISTERING OPTICAL NETWORK UNIT (ONU) BY USING PLURALITY OF SUB-CHANNELS IN OPTICAL COMMUNICATIONS NETWORK

(71) Applicant: ELECTRONICS AND TELECOMMUNICATIONS RESEARCH INSTITUTE, Daejeon-si (KR)

(72) Inventors: Jun Seong Bang, Daejeon-si (KR); Kyeong Hwan Doo, Daejeon-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/843,282

(22) Filed: Sep. 2, 2015

(65) Prior Publication Data

US 2016/0294620 A1    Oct. 6, 2016

(30) Foreign Application Priority Data

Apr. 3, 2015    (KR) .................. 10-2015-0047748

(51) Int. Cl.
*H04J 14/00*    (2006.01)
*H04L 12/24*    (2006.01)
*H04Q 11/00*    (2006.01)

(52) U.S. Cl.
CPC ..... *H04L 41/0816* (2013.01); *H04Q 11/0067* (2013.01); *H04Q 2011/0064* (2013.01)

(58) Field of Classification Search
CPC ............ H04L 41/0816; H04Q 11/0067; H04Q 2011/0079; H04Q 2011/0086;
(Continued)

(56) References Cited

U.S. PATENT DOCUMENTS

2013/0045005 A1*   2/2013   Nakura ............... H04B 10/272
                                                      398/25
2013/0121699 A1    5/2013   Murata
(Continued)

FOREIGN PATENT DOCUMENTS

KR    1020030045016 A    6/2003
KR    1020080114768 A    12/2008

OTHER PUBLICATIONS

Chengjun Li, et al; "Auto Discovery for Optimizing the Connection Set Up Time in Network Restoration for OFDMA-PONs", Published in: Optical Fiber Communication Conference and Exposition (OFC/NFOEC), 2012 and the National Fiber Optics Engineers Conference, Mar. 4-8, 2012; pp. 1-3.

*Primary Examiner* — M. R. Sedighian
(74) *Attorney, Agent, or Firm* — Ladas & Parry LLP; Loren K. Thompson

(57) ABSTRACT

A method of registering or de-registering, by an optical line terminal (OLT), one or more optical network units (ONUs) in an optical communications network. The method may include: setting one or more sub-channels for registration or de-registration among two or more sub-channels, and a size of a contention window in the one or more sub-channels; transmitting, to one or more ONUs, a registration information message including information of the one or more set sub-channels and the size of the contention window; receiving, through one of the set sub-channels, a registration or de-registration request message from the one or more ONUs, which receive the registration information message; and registering and de-registering the one or more ONUs.

19 Claims, 12 Drawing Sheets

(58) Field of Classification Search
CPC ...... H04Q 2011/0064; H04B 10/25758; H04B 10/272; H04J 14/0282; H04J 14/023; H04J 14/0232; H04J 14/0239; H04J 14/0242; H04J 14/0245; H04J 14/0249; H04J 14/025; H04J 14/0252
USPC .......................... 398/70, 71, 72, 67, 69, 66
See application file for complete search history.

(56) References Cited

U.S. PATENT DOCUMENTS

2013/0122385 A1    5/2013  Monig
2013/0259482 A1   10/2013  Sarashina

\* cited by examiner

APPARATUS AND METHOD FOR REGISTERING AND DE-REGISTERING OPTICAL NETWORK UNIT (ONU) BY USING PLURALITY OF SUB-CHANNELS IN OPTICAL COMMUNICATIONS NETWORK

CROSS-REFERENCE TO RELATED APPLICATION(S)

This application claims the benefit under 35 U.S.C. §119(a) of Korean Patent Application No. 10-2015-0047748, filed on Apr. 3, 2015, in the Korean Intellectual Property Office, the entire disclosure of which is incorporated herein by reference for all purposes.

BACKGROUND

1. Field

The following description relates to an optical communications network, and particularly to an apparatus and method for registering and de-registering an optical network unit (ONU).

2. Description of the Related Art

Recently, as optical communications technology is quickly being developed, an optical line terminal (OLT) in an optical network can enhance operation efficiency of network infrastructure by controlling and managing not the network resources in one dimension of each time and wavelength but the network resources in multiple dimensions where at least two of time, wavelength, frequency, code, and space are combined. For example, for such a purpose, resources allocation of two-dimensional networks is studied recently, such as a time- and wavelength-division multiplexing passive optical network (TWDM-PON) and an orthogonal frequency-division multiple access (OFDMA)-PON.

Each ONU connected to the OLT for control and management of network resources in the multi-dimension is required to be registered to an optical network or de-registered depending on the need. Here, the registration indicates joining the ONU that is newly connected or inactive in the optical communications network or resuming operations. The de-registration indicates an inactivation of the operating ONU.

In the past, only the technologies for the OLT to register and de-register the ONU by using a single channel are provided when the OLT communicates with the ONU through the single channel in an optical communications network.

The related art 1 (Sumitomo Electric Industries, Ltd., "a registration method of a PON system and terminal", Application No. KR10-2008-7023635, Pub. No. KR10-2008-0114768, Pub. Date: Dec. 31, 2008) discloses a method of registering an ONU at the lowest transmission speed when being performed at various types of the transmission speeds in a single channel.

The related art 2 (OKI Electric Industry Co., Ltd., Tokyo (JP), "Optical network unit registration method," U.S. application Ser. No. 13/789,886, Pub. No. US2013/0259482A1, Pub. Date: Oct. 3, 2013.) discloses a method of performing a registration process for each wavelength by opening the synchronized discovery window when a plurality of optical branches connected to a plurality of ONUs is connected, with one optical routing unit, to a plurality of OLTs that has each single channel.

The data transmission time according to the distance between the OLT and the ONU is measured through a ranging process after the registration process. To register and de-register the ONU, the OLT receives responses from the ONU by opening a contention window of a predetermined size because it is hard to precisely estimate the responses from the ONU that is located at a specific distance. While the contention window is opened, the data transmission of the operating ONU is not allowable. The round-trip time (RTT) of 200 us is required at an existing transmission distance of 20 km, but in the case of long distance transmission, the RTT of 1 ms is required, thereby stopping the data transmission during at least the RTT and causing problems in providing a low-latency service. In the case of the registration, since the OLT does not have information on the ONU that is newly connected thereto, the OLT need to open the contention window during the time of the contention window as much as the maximum acceptable distance to the ONU. Here, if a single channel is used for the registration, the service may be often disconnected.

In addition, since, in the existing manner, since the resources are wasted for the increased RTT, increasing the scale of the time of the contention window may reduce the collision during the contention in practice. However, during the increased scale of the time of the contention window, data cannot be transmitted, thereby being inefficient in terms of the network resources.

SUMMARY

The present disclosure—relates to an apparatus and method for registering and de-registering an optical network unit (ONU) in an optical communications network so as to provide seamless real-time services even in spite of the increased transmission distance between an optical line terminal (OLT) and an ONU.

The present disclosure relates to an apparatus and method for registering and de-registering an ONU by using a plurality of sub-channels so as to reduce the waste of network resources in an optical communications network.

In one general aspect, a method of registering and de-registering, by an OLT, one or more ONUs in an optical communications network includes: setting one or more sub-channels for registration or de-registration among two or more sub-channels, and a size of a contention window in the one or more sub-channels; transmitting, to one or more ONUs, a registration information message including information of the one or more set sub-channels and the size of the contention window; receiving, through one of the set sub-channels, a registration or de-registration request message from the one or more ONUs, which receive the registration information message; and registering and de-registering the one or more ONUs.

In another general aspect, an optical line terminal (OLT) includes: a registration information setter to set one or more sub-channels for registration or de-registration among two or more sub-channels, and a size of a contention window in the one or more sub-channels; a registration information generator to transmit, to one or more optical network units (ONUs), a registration information message including information of the one or more set sub-channels and the size of the contention window; an ONU registrator to, in response to receiving, through one of the set sub-channels, a registration or de-registration request message from the one or more ONUs, which receive the registration information message, register and de-register the one or more ONUs.

In another general aspect, a method of requesting registration or de-registration of an optical network unit (ONU) to an optical line terminal (OLT) in an optical communications network includes: receiving, from the OLT, one or more sub-channels for registration or de-registration among two or more sub-channels, and a size of a contention window in the one or more sub-channels; and transmitting a registration or de-registration request message to the OLT through one of the sub-channels.

Other features and aspects may be apparent from the following detailed description, the drawings, and the claims.

Figure 1:
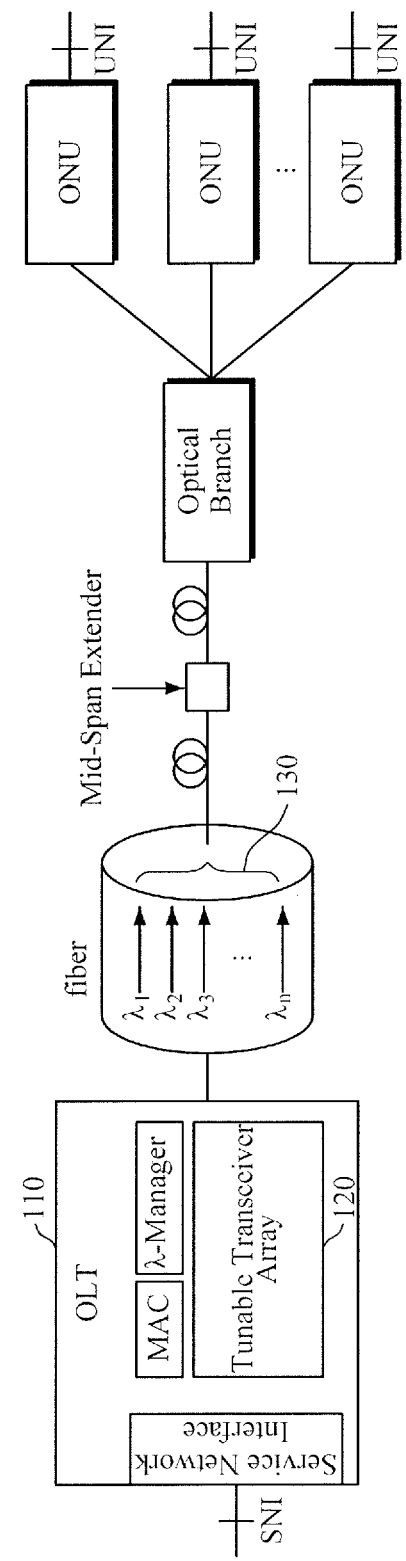
FIG. 1 is a diagram illustrating an example of an optical network having a plurality of physical sub-channels, wherein the present invention is applied to the optical network.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

In the following description, a detailed description of known functions and configurations incorporated herein will be omitted when it may obscure the subject matter with unnecessary detail.

Before describing the exemplary embodiments, terms used throughout this specification are defined. These terms are defined in consideration of functions according to exemplary embodiments, and can be varied according to a purpose of a user or manager, or precedent and so on. Therefore, definitions of the terms should be made on the basis of the overall context.

The present disclosure is an apparatus and method for registering and de-registering an optical network unit (ONU) through an optical line terminal (OLT) that uses one or more sub-channels statically or dynamically when an optical communications network has a plurality of sub-channels physically or logically.

Here, a physical sub-channel indicates a plurality of sub-channels in which one OLT is formed according to a hardware implementation, which will be specifically described with reference to FIGS. 1, 2, and 3.

FIG. 1 is a diagram illustrating an example of an optical network having a plurality of physical sub-channels, wherein the present invention is applied to the optical network.

Referring to FIG. 1, physical sub-channels 130 of the n number of wavelengths are formed by a wavelength-tunable transceiver array 120 in an OLT 110. Now a TWDM-PON is designed to have four or eight wavelengths.

Figure 2:
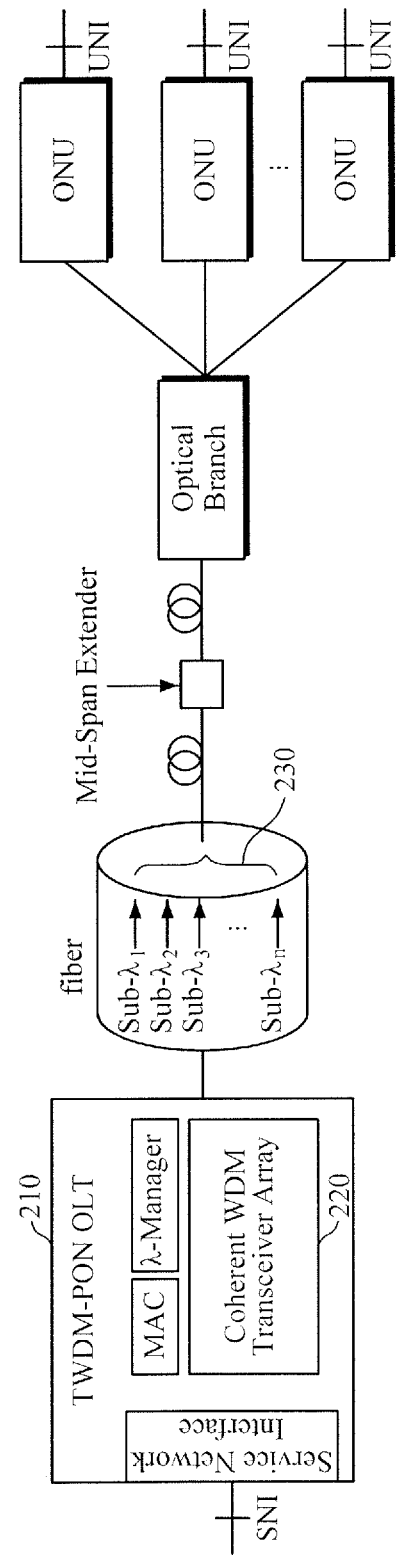
FIG. 2 is a diagram illustrating a coherent wavelength division multiplexing passive optical network (WDM-PON) having a plurality of physical sub-channels, wherein the present invention is applied to the coherent WDM-PON.

FIG. 2 is a diagram illustrating a coherent wavelength division multiplexing (WDM)-passive optical network (PON) having a plurality of physical sub-channels, wherein the present invention is applied to the coherent WDM-PON.

Referring to FIG. 2, the coherent WDM-PON includes the n number of sub-λ physical sub-channels 230 made by a coherent WDM transceiver array 220 in an OLT 210.

Figure 3:
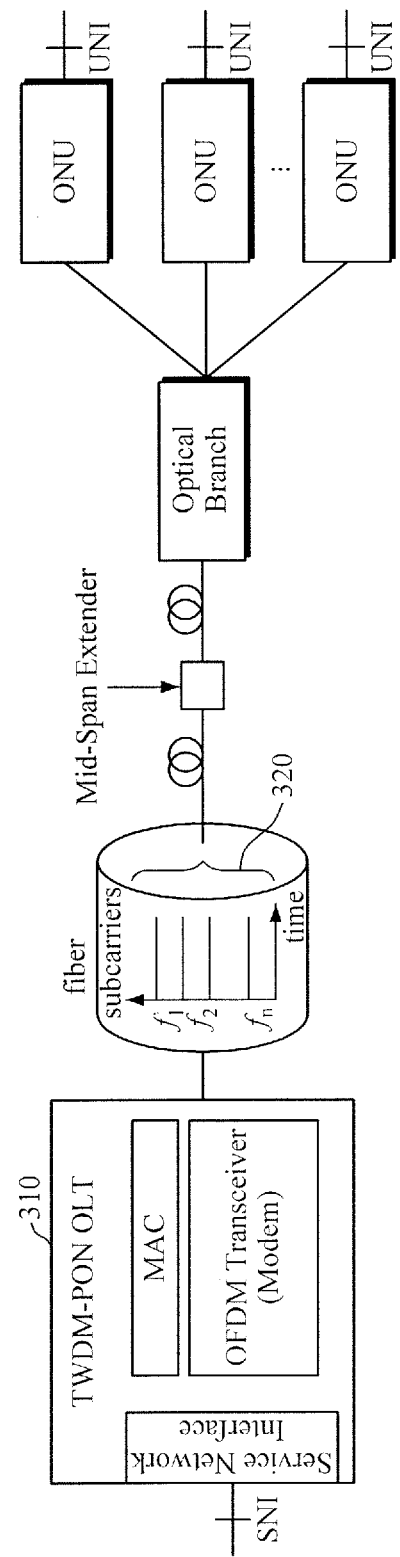
FIG. 3 is a diagram illustrating an orthogonal frequency-division multiplexing access passive optical network (OFDMA-PON) having a plurality of physical sub-channels, wherein the present invention is applied to the OFDMA-PON.

FIG. 3 is a diagram illustrating an orthogonal frequency-division multiplexing access passive optical network (OFDMA-PON) having a plurality of physical sub-channels, wherein the present invention is applied to the OFDMA-PON.

Referring to FIG. 3, the OFDMA-PON includes physical sub-channels 320 by grouping one or more sub-carriers from an OLT 310. The OFDMA-PON is flexible to configure the sub-channels. For example, four sub-carriers may be collected into one sub-channel, and eight sub-carriers may be collected into one sub-channel. In addition, each sub-channel is capable of using another wavelength or the same wavelength although a problem of optical beating interference might be caused when another ONU transmits an optical signal at the moment. The OFDMA-PON may include the m number of sub-channels, each consisting of the n number of sub-carriers.

A logical sub-channel indicates a plurality of sub-channels in which the network resources of plural OLTs are collected and logically formed. A concept of network function virtualization (NFV) or software-defined networking (SDN) is applied, thereby configuring the logical sub-channel.

The NFV is a concept for not connecting physically between domains in the network but making a tunnel passing through the network so as to connect the two domains. The NFV has an advantage of being connectable in the existing structure without the need for a manager to directly connect the domains physically. The SDN indicates programming a network depending on the need and provisioning the network.

Figure 4:
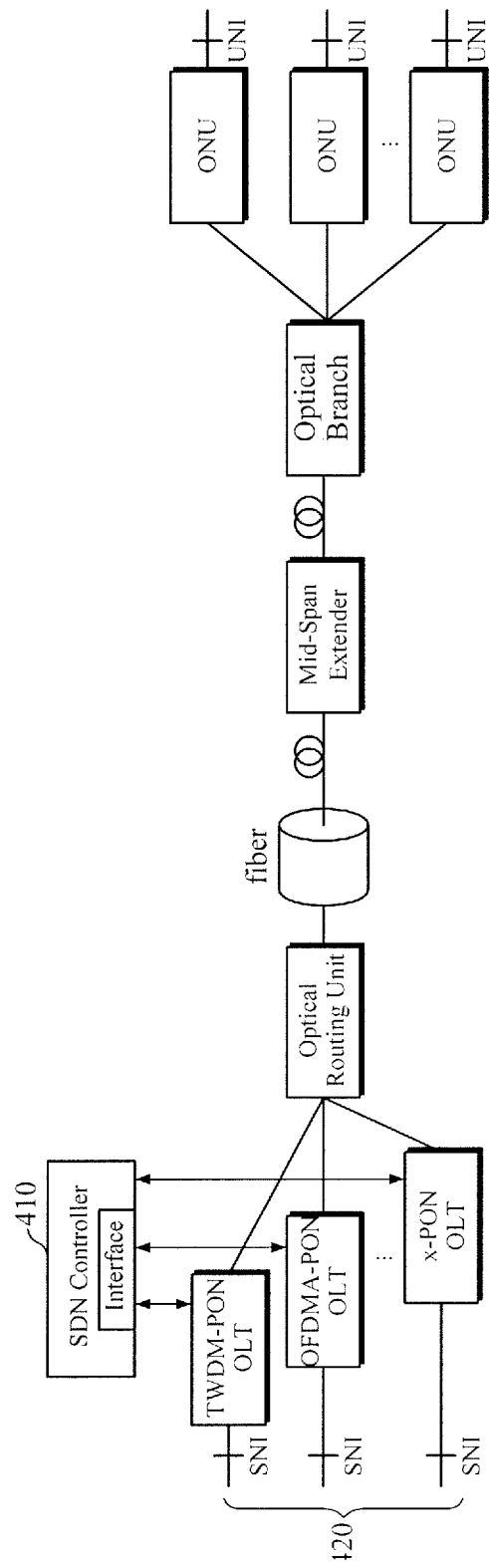
FIG. 4 is a diagram illustrating an optical communications network having a plurality of logical sub-channels, wherein the present invention is applied to the optical communications network.

FIG. 4 is a diagram illustrating an optical communications network having a plurality of logical sub-channels, wherein the present invention is applied to the optical communications network.

Referring to FIG. 4, a specific PON system is controlled or managed by an SDN controller 410 to combine resources, thereby logical sub-channels may be configured or simply by the control of an optical routing unit 420.

An apparatus and method for registering or de-registering an ONU in the optical communications network having the plurality of sub-channels mentioned above is described below. The main difference of the present invention from the existing technology is that the present invention uses network resources in a plurality of areas when registering.

Figure 5:
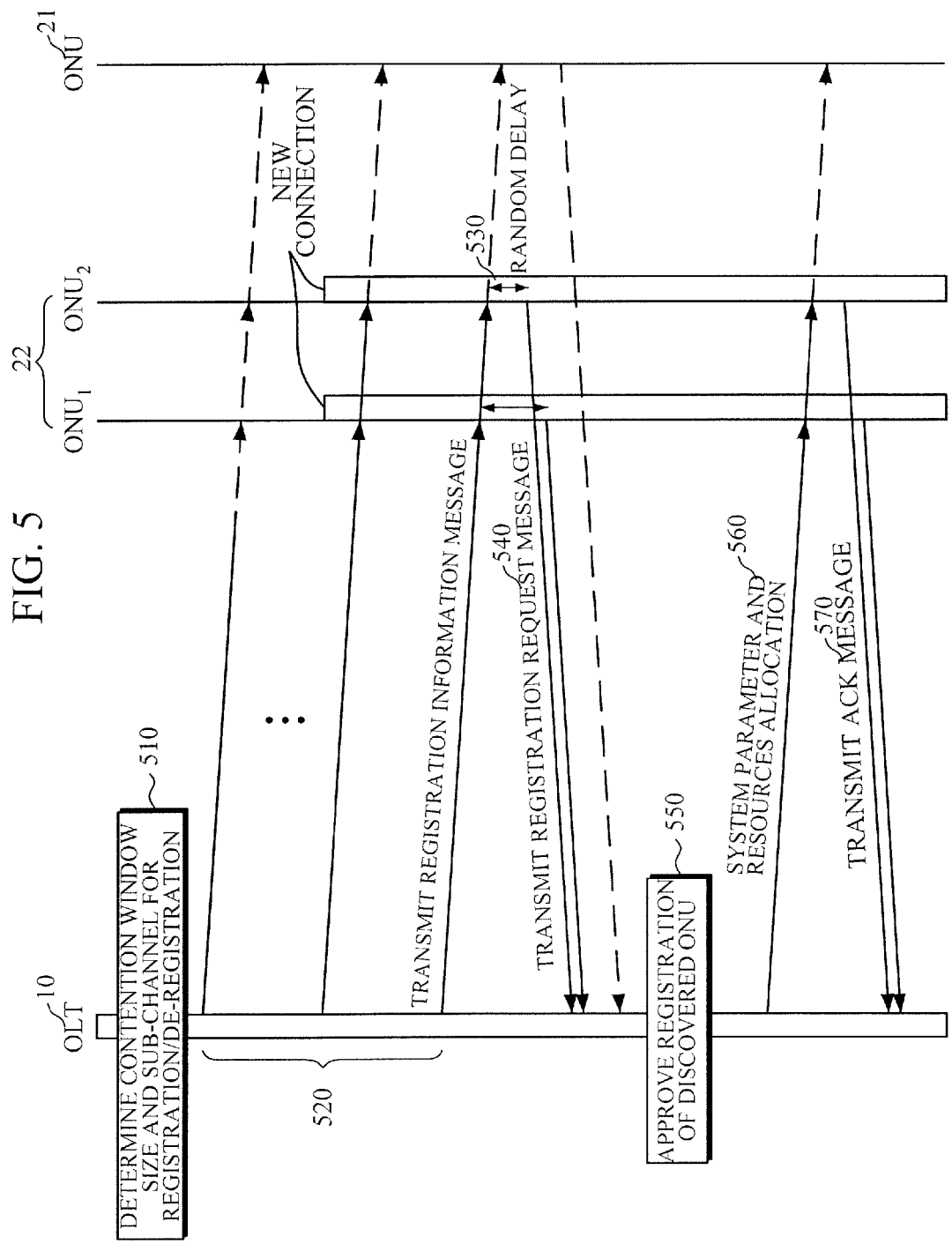
FIG. 5 is a signal flowchart illustrating a method of registering and de-registering ONUs with the use of a plurality of sub-channels according to an exemplary embodiment.

FIG. 5 is a signal flowchart illustrating a method of registering and de-registering ONUs with the use of a plurality of sub-channels according to an exemplary embodiment.

Referring to FIG. 5, an ONU 21 which has been already registered to an optical communications network and in a normal operation state may operate its registration or de-registration by using a sub-channel used in the communications. However, since the system information of ONUs 22 which will be newly connected is unknown to an OLT 10, all the sub-channels are required to be used for the registration process if the OLT 10 does not let the ONUs 22 know which sub-channel for them to use when registering.

Thus, the OLT 10 sets a sub-channel for registration or de-registration among two or more sub-channels and the size of the contention window in such a sub-channel in 510, and transmits a registration information message, which includes information of the set sub-channel and the size of the contention window, to the one or more ONUs 21 and 22 in 520. Here, in the optical network using a synchronous frame, an ONU newly connected prior to the operation 510 acquires synchronization from a downward frame, which goes down periodically. That is, in the case of the synchronous frame, the registration-related control information is included in the part of a frame header.

Also, the number of sub-channels and the size of the contention window in the sub-channel, which are used in requesting the registration and de-registration, may be set statically, or set dynamically through the historical data or the prediction so as to decrease the collision of the message within the contention window. Here, there may be various exemplary embodiments in a method of setting the contention window and the sub-channel, which will be specifically described below.

Also, there may be various exemplary embodiments in a method of displaying the information of the sub-channel through the registration information message, which will be specifically described below with reference to FIGS. 8, 9, and 10.

Referring to FIG. 5 again, if the ONUs 21 and 22 receive the registration information message from the OLT 10, after a random delay for a predetermined period of time in 530, the ONUs 21 and 22 transmits the registration request message (or a de-registration request message), which includes each information of the ONUs 21 and 22, to the OLT 10 through the sub-channel included in the registration information message in 540. In response to the request for de-registration from the ONU 21 previously connected, the ONU 21 changes and transmits a flag within the de-registration request message.

Then, if the OLT 10 receives the registration or de-registration request message, which is transmitted normally without the collision from the ONUs 21 and 22, the OLT 10 discovers the ONU through the received registration or de-registration request message and approves the registration or de-registration of the ONU in 550.

Then, the OLT 10 sends, to the relevant ONU, notification that the registration is completed through system parameters and resources allocation in 560. The ONUs 21 and 22 send notification that the registration is completed, by transmitting a REGISTER_ACK message to the OLT by using allocated upward resources in 570.

Hereinafter, various exemplary embodiments for setting information of the contention window and the sub-channel as mentioned above are described.

In one example, one or more sub-channels may be set to be always statically used for registration or de-registration. Thus, ONUs may request the registration and de-registration to an OLT through the sub-channel, set to be always statically used, regardless of the contention window, which will be specifically described with reference to FIG. 6.

Figure 6:
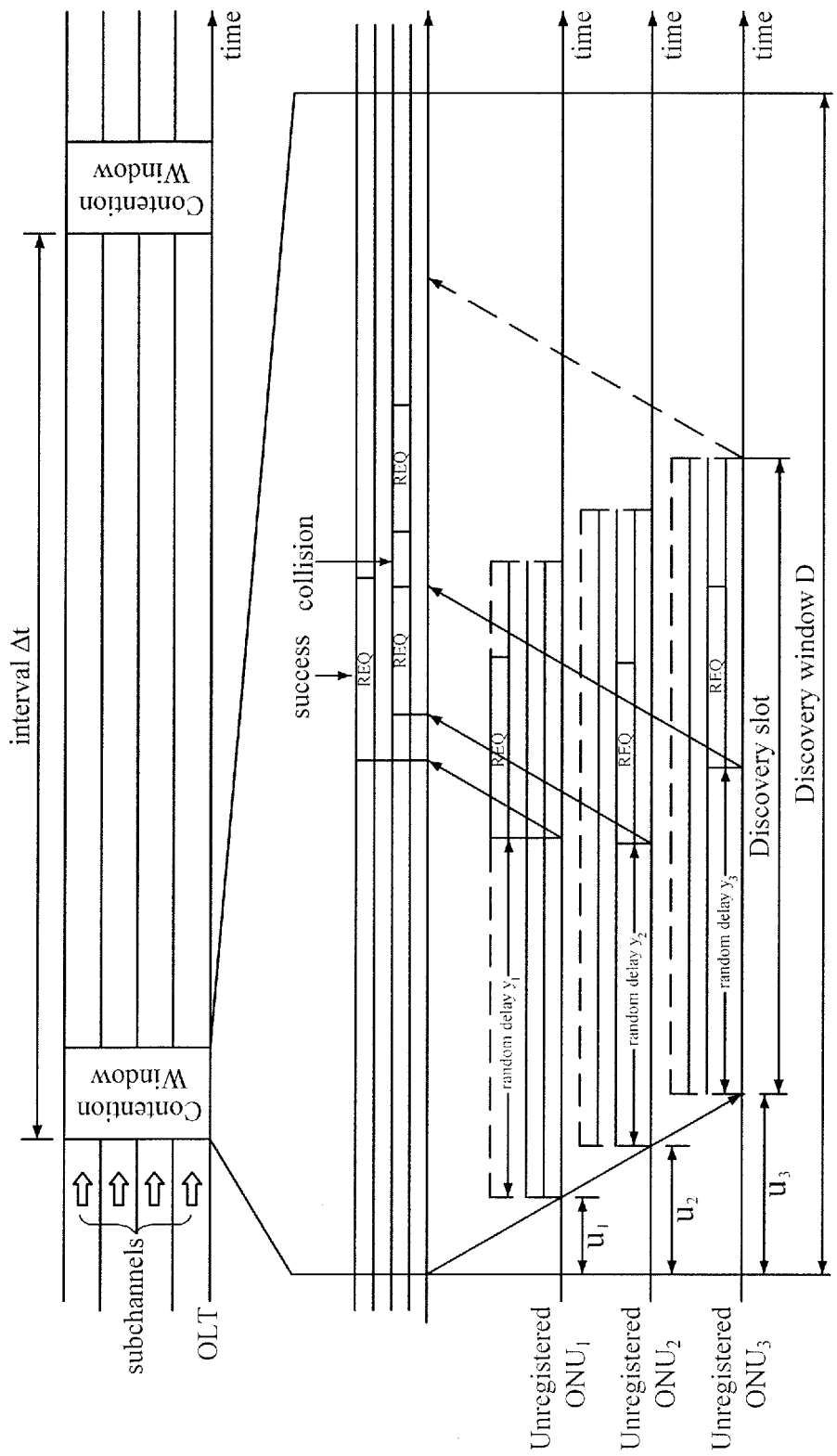
FIG. 6 is a diagram illustrating an example of a registration process in an optical subscriber network having a plurality of physical sub-channels according to an exemplary embodiment.

FIG. 6 is a diagram illustrating an example of a registration process in an optical subscriber network having a plurality of physical sub-channels according to an exemplary embodiment.

Referring to FIG. 6, if there are four sub-channels, one of the four sub-channels is always open for the registration so as to be always used for the registration of ONU. A benefit of such a method is that an ONU is capable of always requesting a registration to an OLT. However, an OLT and ONU system is required to use only the set wavelength or sub-channel (one or more sub-carrier groups). That is, it is impossible that the sub-channel is dynamically used, which decreases the flexibility of the network. In addition, in a case in which there is the small number of the sub-channels so that each sub-channel has a large capacity (e.g., 2.5 Gbit/s and 10 Gbit/s), the waste of network resources may be caused.

In another example, the predetermined number of sub-channels may be set to be always statically used for registration or de-registration during the time of the contention window. For example, the predetermined number of sub-channels is used for registration periodically during a predetermined time and then is used for data transmission. Such an operation may be performed through the correction of the protocol in the related art, but there may be a disadvantage that the number of the sub-channels is not able to be set dynamically according to the number of the registration and de-registration requests, which may cause the waste of network resources.

In yet another example, a sub-channel for registration or de-registration and its contention window may be set dynamically. In other words, the OLT dynamically selects the sub-channel according to the circumstances and transmits the information to the ONU in a bitmap form. The ONU receiving the information selects one of the usable sub-channels and requests the registration or de-registration. The OLT is capable of dynamically determining the scale of the time of the contention window as well as the sub-channel for the registration. Thus, the waste of network resources may be reduced through the estimation of usable sub-channels. However, the ONU needs another function for interpreting the transmitted bitmap information.

In yet another example, in a case in which an optical network accommodates an ONU included in a different type of a network system, one or more sub-channels may be used for registration and de-registration in the scale of the time of a specific contention window in specific time. Here, the procedure may be divided into a sub-channel for registration and a sub-channel for de-registration according to the number of requests for registration and de-registration and be performed.

Figure 7:
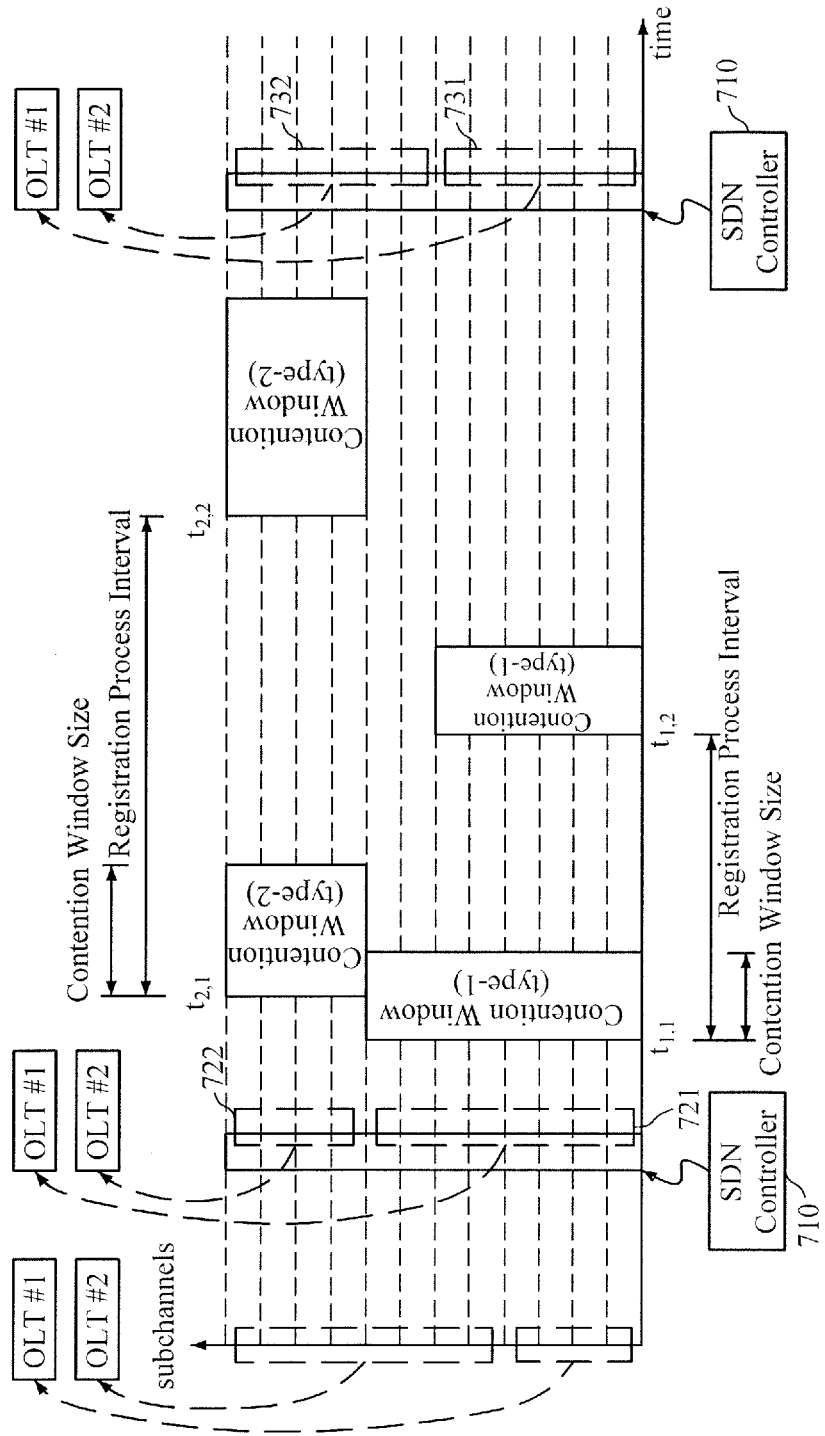
FIG. 7 is a diagram illustrating an example of a registration process in an optical subscriber network having a plurality of logical sub-channels according to an exemplary embodiment.

Also, in the case in which the sub-channel is shared logically as network resources, a range of the sub-channel for the registration as illustrated in FIG. 7 below may be changed dynamically.

FIG. 7 is a diagram illustrating an example of a registration process in an optical subscriber network having a plurality of logical sub-channels according to an exemplary embodiment.

Referring to FIG. 7, if network resources are virtualized, the network resources are configured logically by an SDN controller 710. At the beginning, the OLT #1 has eight sub-channels 721, and the OLT #2 has four sub-channels 722. As the channel circumstance is changed after a period of time, the SDN controller 710 changes the number of the sub-channels to be allocated so that OLT #1 has six sub-channels 731 and the OLT #2 has six sub-channels 732. Then, OLT #1 and OLT #2 perform the registration process by using the allocated sub-channels. Here, the interval of such registration process, a size of a contention window, the number of the sub-channels, or the like, may be determined according to each of the OLTs. The OLT performs the registration or de-registration process of the ONU by using both the allocated network resources and one or more sub-channels. The time and the interval of the registration process may vary according to the type of a network system where the ONU is included. Next, a registration information message will be described.

Figure 8:
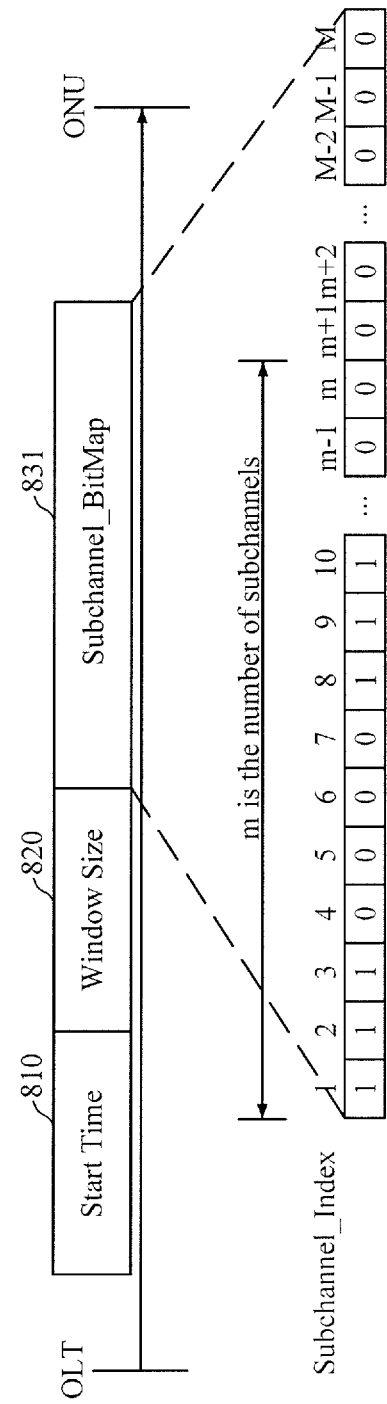
FIGS. 8 to 10 are diagrams illustrating an example of a registration information message according to an exemplary embodiment.
Figure 9:
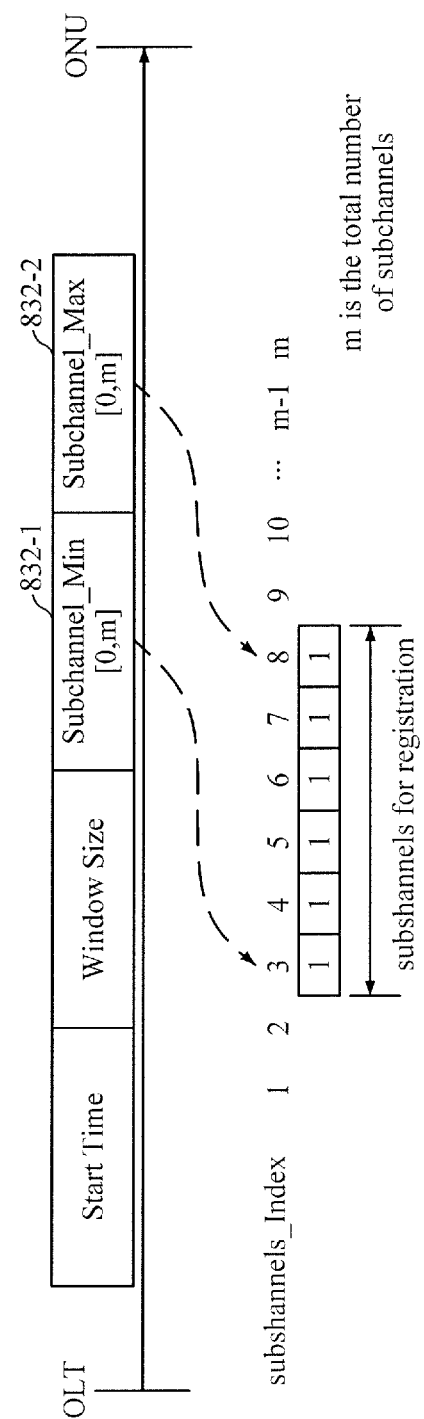
Figure 10:
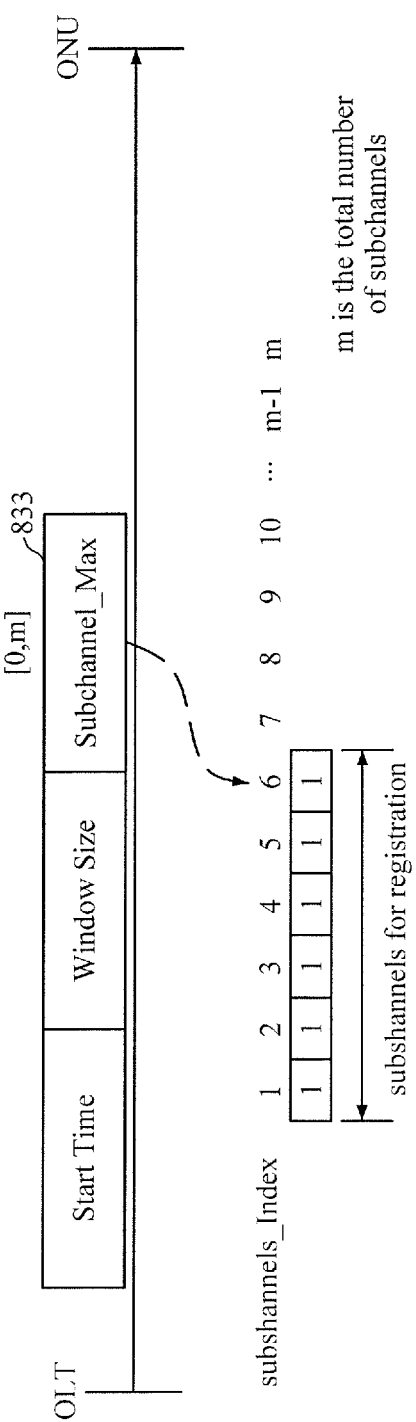

FIGS. 8 to 10 are diagrams illustrating a constitution of a registration information message according to an exemplary embodiment.

Referring to FIGS. 8 to 10, a registration information message includes a start time 810, the size of a contention window, and information that shows usable sub-channels 831, 832-1, 832-2, and 833. Also, a plurality of sub-channels is divided by a Subchannel_Index, wherein M is the number of sub-channels that could be supported maximally in an optical network, and m is the number of sub-channels in an optical network that currently operates.

There may be various exemplary embodiments of a method of displaying a sub-channel. In one exemplary embodiment referring to FIG. 8, a bitmap 830 for registration or de-registration is included in a registration information message, wherein the bitmap shows whether the sub-channel is used for each Subchannel_Index. For example, '1' is marked on the Subchannel_Indexes 1, 2, 3, . . . , 8, 9, and 10, which indicates a channel that is usable for registration or de-registration.

In another exemplary embodiment referring to FIG. 9, a registration information message includes a minimum index 832-1 and a maximum index 832-2, which are in the range of the sub-channels to be used for registration or de-registration. For example, the minimum index 832-1 is 3 and the maximum index 832-2 is 8 so that six sub-channels are usable. Here, an ONU may select one of the sub-channels as a channel for registration. For example, the sub-channel for registration may be selected between the minimum index and the maximum index by using a random function, or selected by using previously designated counters (minimum index+counter % (maximum index−minimum index+1)).

In yet another exemplary embodiment referring to FIG. 10, one of a minimum index and a maximum index is fixed, which are in the range of the sub-channels to be used for registration or de-registration, and a registration information message includes the other index 833. For example, the Subchannel_Index 1 is fixed as the minimum index that is in the range of the sub-channels, and in the case of the range of the sub-channels being six, only the maximum index, which is six, is included in information of the sub-channels. However, such a case is not applied to the case in which a plurality of OLTs shares the resources of the sub-channels.

However, if the number of the sub-carriers at an ONU, which are usable in the sub-channels, is not appropriate, is not appropriate, the number of the sub-carriers within the sub-channels is required to be adjusted appropriately. However, since the OLT does not have such information, the number of the sub-carriers is required to be the same for each sub-channel basically. In the case of a plurality of the sub-carriers in each sub-channel, the sixteen of the sub-carriers may be reduced to eight if the system is allowed. However, in the opposite case, problems of the system operation may occur. Thus, the number of the sub-carriers within each sub-channel is required to be greater than the minimum number of the sub-carriers that are usable at the ONU, which are written in the specification. Thus, the ONU is required to give, to the OLT, the information on the number of the sub-carriers in each sub-channel depending on the need.

For the allocation of the sub-channels for the registration, priorities may be set in the time or frequency domain so that the registration and de-registration may be performed according to the priorities.

The present disclosure may be advantageously used through the following method regarding the registration process. In the case of the registration and de-registration processes being performed using a plurality of the sub-channels, if the number of the sub-carriers is greater than the number of the ONUs to be registered (e.g., 128 sub-channels, each of which uses each sub-channel), each ONU uses the sub-channels as it is, which have been used at the beginning for the registration. At the OLT, such information is stored.

Figure 11:
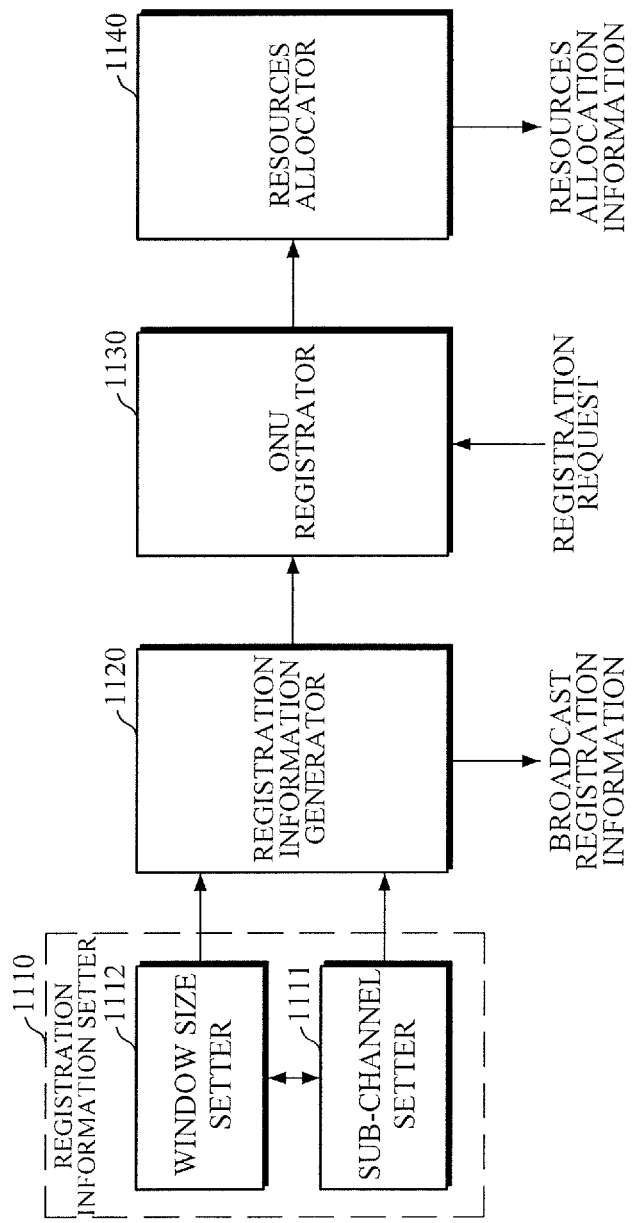
FIG. 11 is a diagram illustrating an optical line terminal (OLT) according to an exemplary embodiment.

FIG. 11 is a diagram illustrating an optical line terminal (OLT) according to an exemplary embodiment.

Referring to FIG. 11, the OLT includes a registration information setter 1110, a registration information generator 1120, an ONU registrator 1130, and a resources allocator 1140.

The registration information setter 1110 includes a sub-channel setter 1111 and a window size setter 1112. The window size setter 1112 sets the sub-channel for registration or de-registration among two or more sub-channels. The window size setter 1112 sets the size of a contention window in the sub-channel.

The registration information setter 1120 sets at least one sub-channel to be statically used for registration or de-registration; sets the predetermined number of the sub-channels to be always statically used for registration or de-registration during the time of the contention window; and dynamically sets the sub-channel for registration or de-registration and its contention window. In addition, when the ONU included in a different type of a network system is accommodated, the sub-channels for registration and de-registration are set, respectively. Also, in the case of the sub-channels being logical sub-channels, the registration information setter 1120 dynamically changes the sub-channel and the contention window as the sub-channel allocated currently to the OLT is changed.

The registration information generator 1120 broadcasts, to one or more ONUs, a registration information message, which includes information of the set sub-channel and the size of the contention window. The registration information generator 1120 includes a bitmap for registration or de-registration is included in the registration information message, wherein the bitmap shows whether the sub-channel is used for each sub-channel index. In another exemplary embodiment, by the registration information generator 1120, a minimum index and a maximum index, which are in the range of the sub-channels to be used for registration or de-registration, are included. In yet another exemplary embodiment, in the case one of the minimum index and the maximum index is fixed by the registration information generator 1120, the other index is included in a registration information message.

The ONU registrator 1130 receives the registration or de-registration request message from the ONU receiving the registration information message through one of the set sub-channels, and registers or de-registers such an ONU.

The resources allocator 1140 transmits the information of system parameters and resources allocation.

Figure 12:
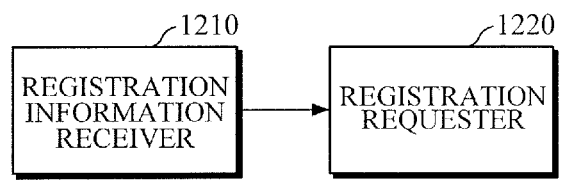
FIG. 12 is a diagram illustrating an optical network unit (ONU) according to an exemplary embodiment.

FIG. 12 is a diagram illustrating an optical network unit (ONU) according to an exemplary embodiment.

Referring to FIG. 12, an ONU includes a registration information receiver 1210 and a registration requester 1220.

The registration information receiver 1210 receives, from an OLT, a registration information message including a sub-channel for registration or de-registration among two or more sub-channels and the size of a contention window in such a sub-channel.

The registration requester 1220 transmits, to the OLT, a registration or de-registration request message through one of the sub-channels. Then, in response to the reception of the information of system parameters and resources allocation from the OLT, the registration requester 1220 transmits ACK to the OLT as its response.

According to the present disclosure, in the case a plurality of sub-channels is used in a flexible network structure, the some parts of the sub-channels are used for registration, and the others are used for a data transmission service so as to reduce the delay of real-time services.

In addition, in the case a heterogeneous terminal is accommodated, an independent registration method may be performed for each sub-channel in an independent time period.

In the conventional method, the scale of the time of the contention window e.g., Discovery Slot or Quiet Window is adjusted to reduce the waste of resources. However, if a plurality of sub-channels is used as in the present disclosure, the number of the sub-channels required and window time may be controlled dynamically so as to more efficiently use the resources.

According to the present disclosure, some sub-channels are used for the registration, thereby having a contention window.

The present disclosure controls the number of sub-channels based on a collision record during the contention or based on probabilities, thereby greatly enhancing resource utilization.

Also, in view of software-defined networks, the present disclosure may have an advantage in expanding to the performance of each terminal's network registration processes in the heterogeneous networks through logical center and decentralized controls.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of registering and de-registering, by an optical line terminal (OLT), one or more optical network units (ONUs) in an optical communications network, the method comprising:
    setting one or more sub-channels for registration or de-registration among two or more sub-channels, and a size of a contention window in the one or more sub-channels;
    transmitting, to one or more ONUs, a registration information message including information of the one or more set sub-channels and the size of the contention window;
    receiving, through one of the set sub-channels, a registration or de-registration request message from the one or more ONUs, which receive the registration information message; and
    registering and de-registering the one or more ONUs, which have transmitted the registration or de-registration request message,
    wherein the optical communications network has a plurality of sub-channels,
    wherein the transmitting a registration information message comprises including an information indicating the one or more sub-channels among a plurality of sub-channels to be used for registration or de-registration, in the registration information message.

2. The method of claim 1, wherein the setting of the one or more sub-channels comprises setting at least one of the sub-channels to be statically used for registration or de-registration.

3. The method of claim 1, wherein the setting of the one or more sub-channels comprises setting a predetermined number of the sub-channels to be statically used for registration or de-registration during a time of a predetermined size of the contention window.

4. The method of claim 1, wherein the setting of the one or more sub-channels comprises dynamically setting the one or more sub-channels for registration or de-registration and the size of the contention window thereof.

5. The method of claim 1, wherein the setting of the one or more sub-channels comprises setting sub-channels for registration and de-registration, respectively, in a case the one or more ONUs included in a different type of a network system are registered or de-registered.

6. The method of claim 1, wherein the setting of the one or more sub-channels comprises, in a case of the one or more sub-channels being logical sub-channels, dynamically changing the sub-channel and the contention window thereof as the sub-channel allocated currently to the OLT is changed.

7. The method of claim 1, wherein the transmitting of the registration information message comprises including a bitmap in the registration information message, wherein the bitmap shows whether the one or more sub-channels are used for each sub-channel index.

8. The method of claim 1, wherein the transmitting of the registration information message comprises including, in the registration information message, a minimum index and a maximum index, which are in a range of the one or more sub-channels to be used for registration or de-registration.

9. The method of claim 1, wherein the transmitting of the registration information message comprises:
    in a case in which one of a minimum index and a maximum index is fixed, which are in a range of the one or more sub-channels to be used for registration or de-registration, including the other index in the registration information message.

10. An optical line terminal (OLT), comprising:
a registration information setter configured to set one or more sub-channels for registration or de-registration among two or more sub-channels, and a size of a contention window in the one or more sub-channels;
a registration information generator configured to transmit, to one or more optical network units (ONUs), a registration information message including information of the one or more set sub-channels and the size of the contention window;
an ONU registrator configured to, in response to receiving, through one of the set sub-channels, a registration or de-registration request message from the one or more ONUs, which receive the registration information message, register and de-register the one or more ONUs,
wherein the optical communications network has a plurality of sub-channels,
wherein a registration information generator configured to include an information indicating the one or more sub-channels to be used for registration or de-registration, in the registration information message.

11. The OLT of claim 10, wherein the registration information setter is configured to set at least one of the sub-channels to be statically used for registration or de-registration.

12. The OLT of claim 10, wherein the registration information setter is configured to set a predetermined number of the sub-channels to be statically used for registration or de-registration during a time of a predetermined size of the contention window.

13. The OLT of claim 10, wherein the registration information setter is configured to dynamically set the one or more sub-channels for registration or de-registration and the size of the contention window thereof.

14. The OLT of claim 10, wherein the registration information setter is configured to set sub-channels for registration and de-registration, respectively, in a case the one or more ONUs included in a different type of a network system are registered or de-registered.

15. The OLT of claim 10, wherein the registration information setter is configured to, in a case of the one or more sub-channels being logical sub-channels, dynamically change the sub-channel and the contention window thereof as the sub-channel allocated currently to the OLT is changed.

16. The OLT of claim 10, wherein the registration information generator is configured to include a bitmap in the registration information message, wherein the bitmap shows whether the one or more sub-channels are used for each sub-channel index.

17. The OLT of claim 10, wherein the registration information generator is configured to include, in the registration information message, a minimum index and a maximum index, which are in a range of the one or more sub-channels to be used for registration or de-registration.

18. The OLT of claim 10, wherein the registration information generator is configured to
in a case in which one of a minimum index and a maximum index is fixed, which are in a range of the one or more sub-channels to be used for registration or de-registration, including the other index in the registration information message.

19. A method of requesting registration or de-registration of an optical network unit (ONU) to an optical line terminal (OLT) in an optical communications network, the method comprising:
receiving, from the OLT, a registration information message including information of the one or more sub-channels for registration or de-registration among two or more sub-channels, and a size of a contention window in the one or more sub-channels; and
transmitting a registration or de-registration request message to the OLT through one of the sub-channels,
wherein the optical communications network has a plurality of sub-channels,
wherein the registration information message includes an information indicating the one or more sub-channels to be used for registration or de-registration.

* * * * *